United States Patent
Carbonneau et al.

(10) Patent No.: US 9,235,906 B2
(45) Date of Patent: Jan. 12, 2016

(54) SCALABLE PROCESSING FOR ASSOCIATING GEOMETRIES WITH MAP TILES

(71) Applicant: Apple Inc., Cupertino, CA (US)

(72) Inventors: Guillaume A. Carbonneau, Alameda, CA (US); Vincent Dumont, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 611 days.

(21) Appl. No.: 13/632,003

(22) Filed: Sep. 30, 2012

(65) Prior Publication Data

US 2013/0328941 A1    Dec. 12, 2013

Related U.S. Application Data

(60) Provisional application No. 61/657,872, filed on Jun. 10, 2012.

(51) Int. Cl.
| | |
|---|---|
| *G09G 5/00* | (2006.01) |
| *G06T 11/00* | (2006.01) |
| *G01C 21/32* | (2006.01) |
| *G06F 17/30* | (2006.01) |

(52) U.S. Cl.
CPC ............ *G06T 11/00* (2013.01); *G01C 21/32* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 5,787,233 A | 7/1998 | Akimoto | |
| 5,848,375 A | 12/1998 | Nunobiki et al. | |
| 6,480,783 B1 | 11/2002 | Myr | |
| 6,615,130 B2 | 9/2003 | Myr | |
| 7,379,811 B2 | 5/2008 | Rasmussen et al. | |
| 7,551,172 B2 | 6/2009 | Yaron et al. | |
| 7,746,343 B1 | 6/2010 | Charaniya et al. | |
| 8,237,713 B2 | 8/2012 | Yaron et al. | |
| 8,681,176 B1 | 3/2014 | Maurer et al. | |

(Continued)

FOREIGN PATENT DOCUMENTS

| | | |
|---|---|---|
| WO | WO 2005/103624 | 11/2005 |
| WO | WO 2011/146141 | 11/2011 |

OTHER PUBLICATIONS

Chen, Ching-Chien, et al., "Automatically Conflating Road Vector Data with Orthoimagery," GeoInformatica, Mar. 2006, pp. 495-530, Springer Science + Business Media, LLC.

(Continued)

*Primary Examiner* — Peter Hoang
(74) *Attorney, Agent, or Firm* — Adeli LLP

(57) ABSTRACT

A method is provided that utilizes a parallel processing system to determine whether different geometries intersect each tile in a map hierarchy. The method receives a description of a geometry and an identification of a tile in a tile tree. The method utilizes an available processing unit to determine whether the geometry intersects the tile. When the geometry intersects the tile and the tile has child tiles, the method stores several task descriptions that can be assigned to any processing units in the parallel processing system. Each task description includes the description of the portion of the geometry that overlaps the tile and an identification of one of the child tiles of the tile. The method then assigns each of the tasks to an available processing unit to continue down the tree hierarchy to determine whether each child tile intersects a portion of the geometry.

17 Claims, 12 Drawing Sheets

(56) References Cited

U.S. PATENT DOCUMENTS

| | | | |
|---|---|---|---|
| 8,738,284 | B1 | 5/2014 | Jones |
| 2001/0028350 | A1 | 10/2001 | Matsuoka et al. |
| 2003/0231190 | A1 | 12/2003 | Jawerth et al. |
| 2004/0236507 | A1 | 11/2004 | Maruyama et al. |
| 2006/0025923 | A1 | 2/2006 | Dotan et al. |
| 2007/0080830 | A1 | 4/2007 | Sacks |
| 2008/0016145 | A1 | 1/2008 | Takase et al. |
| 2008/0238941 | A1 | 10/2008 | Kinnan et al. |
| 2010/0002007 | A1 | 1/2010 | Rajagopalan |
| 2010/0074538 | A1 | 3/2010 | Mishra et al. |
| 2010/0104174 | A1 | 4/2010 | Rohlf et al. |
| 2010/0250536 | A1 | 9/2010 | Broadbent |
| 2011/0007094 | A1* | 1/2011 | Nash et al. .................... 345/634 |
| 2011/0207446 | A1 | 8/2011 | Iwuchukwu |
| 2012/0050489 | A1 | 3/2012 | Gupta et al. |
| 2012/0206469 | A1 | 8/2012 | Hulubei et al. |
| 2012/0209518 | A1 | 8/2012 | Nowak et al. |
| 2013/0021382 | A1 | 1/2013 | Morlock et al. |
| 2013/0076784 | A1 | 3/2013 | Maurer et al. |
| 2013/0328937 | A1 | 12/2013 | Pirwani et al. |

OTHER PUBLICATIONS

Hu, Jiuxiang, et al., "Road Network Extraction and Intersection Detection From Aerial Images by Tracking Road Footprints", IEEE Transactions on Geoscience and Remote Sensing, Dec. 2007, pp. 4144-4157, vol. 45, No. 12, IEEE.

Poullis, Charalambos, et al., "Delineation and geometric modeling of road networks", ISPRS Journal of Photogrammetry and Remote Sensing, Month Unknown, 2010, pp. 165-181, vol. 65, Computer Graphics and Immersive Technologies Lab, Integrated Media Systems Center, University of Southern California, United States.

Author Unknown, "(SC4) Sim City for Highways & Autobahns," Aug. 12, 2011, pp. 1-35, available at http://www.skyscrapercity.com/showthread.php?t=639496&page=14.

Author Unknown, "Resolve Road Conflicts (Cartography)," ARCGIS help 10.1, Nov. 11, 2011, 4 pages, ESRI, available at http://help.arcgis.com/en/arcgisdesktop/10.0/help/index.html#//007000000019000000.htm.

* cited by examiner

SCALABLE PROCESSING FOR ASSOCIATING GEOMETRIES WITH MAP TILES

CLAIM OF BENEFIT TO PRIOR APPLICATIONS

This Application claims the benefit of U.S. Provisional Application 61/657,872, entitled "Scalable and Efficient Cutting of Map Tiles," filed Jun. 10, 2012. U.S. Provisional Application 61/657,872 is herein incorporated by reference.

BACKGROUND

Computerized map programs allow a user to view a great deal of data. Some applications allow a client device to download map data that encompasses any location in the world at a detailed level. Such applications entail enormous quantities of data to include all the roads, shorelines, parks, etc. in the world. This data is too voluminous to be displayed or downloaded all at once. Accordingly, many applications provide map tiles with data at appropriate scales. Before delivering these tiles, the tiles must be generated and optimized for downloading to a client device.

Generating the tiles requires processing an enormous amount of computerized data about geographical features of the regions, which the computed tiles will represent. The tiles represent different areas and the features of one tile do not affect the features of any other tile on the same scale. However, the tiles on one scale are used to determine which features are potentially in the tiles on a different scale that share part of the same geographical area.

BRIEF SUMMARY

Some embodiments of the invention provide a method for receiving the description of a map that is defined as a hierarchical tile structure and identifying associations between the map tiles and a set of geometries that intersect the tile. The map is defined as a tile tree with multiple levels that correspond to multiple zoom levels for viewing the map. The tile tree has a root tile with no parent and multiple child tiles. The tile tree also includes a group of leaf tiles, each with one parent tile and no child tiles. The tile tree also includes a group of intermediate tiles, each with one parent tile and multiple child tiles. In some embodiments, the tile tree is a quadtree where the root tile and each intermediate tile have four child tiles.

The method in some embodiments utilizes a parallel processing system to determine whether each geometry intersects each tile in the map hierarchy. The method receives a description of a geometry and an identification of a tile in the tile tree. The identification of the tile in some embodiments uniquely identifies the tile and the child tiles (if any) of the tile. The method utilizes an available processing unit of the parallel processing system to determine whether the geometry intersects the tile. When the geometry intersects the tile and the tile has child tiles (i.e., the tile is not a leaf tile), the method stores several task descriptions that can be assigned to any processing units in the parallel processing system. Each task description includes the description of the portion of the geometry that overlaps the tile and an identification of one of the child tiles of the tile. The method then assigns each of the tasks to an available processing unit to continue down the tree hierarchy to determine whether each child tile intersects a portion of the geometry.

The method repeats the same process for each geometry that is associated with the map. In some embodiments, each processing unit stores a description of a portion of each geometry that intersects a tile in a local storage structure that corresponds to the tile. For instance, in some embodiments, each tile is identified by a number and the local storage structure is indexed by the tile number. The method then utilizes a set of processing units in the parallel processing system to retrieve this information from local storage of different processing units and merge them in a storage structure that includes the description of the portions of every geometry that intersects a particular tile in a storage structure that corresponds to the tile.

The preceding Summary is intended to serve as a brief introduction to some embodiments described herein. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
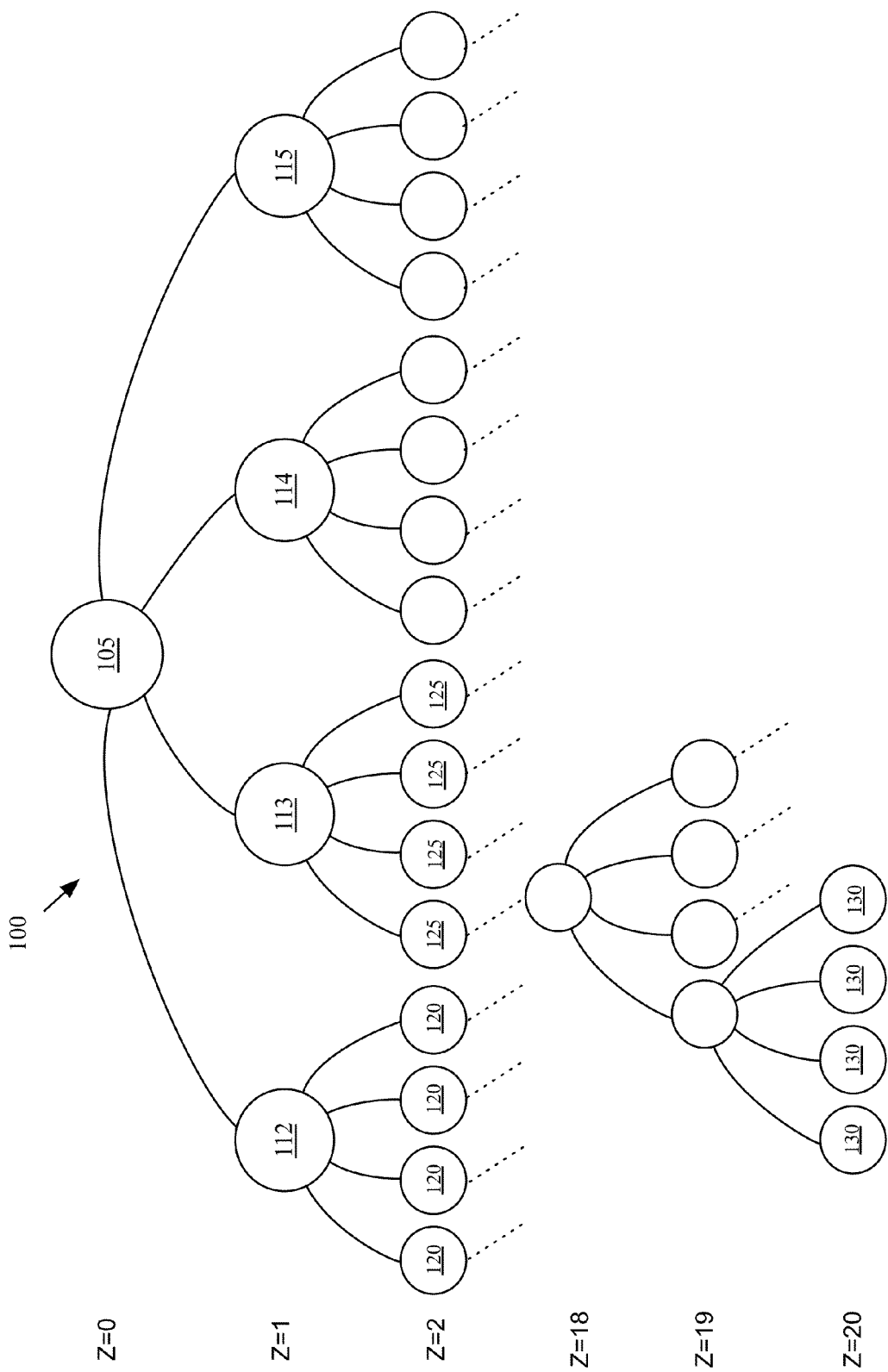
FIG. 1 conceptually illustrates a quadtree used in some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an efficient and scalable method for dividing the description of a map into a hierarchical tile structure. In some embodiments, this method uses a novel parallel processing approach to identify associations between map tiles and geometries that are to be stored in such tiles. Also, in some embodiments, the method uses a novel re-encoding technique to generate smaller map vector tiles (i.e., tiles using fewer bits of data) for storing road data.

The map tiles are used in some embodiments to present 3D map presentations for browsing and navigation on a client device. In some embodiments, the client device (e.g., a mobile device) has a touch-sensitive screen and a multi-touch interface that allow a user to interact with the presentations through touch and gestural inputs on the screen. In other embodiments, the presentations are provided on a device that does not have a touch-sensitive screen. In some embodiments described below, these 3D presentations are provided by an integrated mapping application that provides several useful modalities, such as location browsing, map searching, route identifying, and route navigation operations. However, in other embodiments, the mapping application does not employ all of these modalities and/or provides only 2D map presentations. For instance, in some embodiments, the mapping application does not provide route navigation.

Before generating the map tiles that are needed for the generation of the map presentations, some embodiments use a set of servers to receive map data from a variety of vendors and to generate the descriptions of the road, building, and other geometries that are to be stored in the tiles. Some of the tasks that are performed in some embodiments to generate this description include (1) processing such data to produce one dimensional (1D) roads, (2) smoothing the 1D road graphs, (3) defining data to specify junctions, (4) generating 2D road geometries and land cover, (5) smoothing the 2D road geometries, (6) generating data (e.g., estimated height data) regarding buildings, (7) using such data to define building geometries, (8) constructing road geometries details (such as islands, lane markings, and distances and land cover between road geometries), and (9) identifying geometry edge node characteristics and propagating such characteristics.

One of the last operations performed by the set of servers that generate the map tiles is the tile cut operation, which generates the map tiles and encodes the geometric and vector data in these tiles. In some embodiments, the set of servers defines a map in terms of a tile tree with multiple levels that correspond to multiple zoom levels for viewing the map. For instance, the tile tree data structure in some embodiments is a quadtree with 21 levels that correspond to 21 zoom levels for viewing the map. In the quadtree, each node is a map tile, and each non-leaf node has four child tile nodes. One example of such a quadtree is illustrated in FIG. 1.

FIG. 1 conceptually illustrates a quadtree used in some embodiments of the invention. As shown, the quadtree 100 has one node 105 at the root level that corresponds to a map tile at zoom level of 0. Zoom level 0 in some embodiments covers the whole map. For instance, if the map data covers the whole world or all North America, then the tile at zoom level 0 covers the whole world or all North America respectively.

At the next level, zoom level 1, the quadtree 100 includes the four children 112-115 of the root node 105. If the map at zoom level 0 covers a rectangular area, the tiles at each of the four nodes 112-115 cover one of the four quadrants of the rectangle. Similarly, at zoom level 2, the nodes are children of nodes at level 1. For instance, the four nodes 120 are children of node 112, the four nodes 125 are children of node 113, etc. A map tile at each of these nodes includes $\frac{1}{4}^{th}$ of the area of the parent tile.

In the example of FIG. 1 the quadtree 100 has 21 levels. Therefore, nodes 130 at zoom level 20 are the leaf nodes and do not have any children. Map tiles at this level provide the most details but cover the least amount of area compared to the tiles at lower zoom levels.

The tile cut operation has several novelties. One novelty is the fast mechanism that it uses to associate each geometry that was generated for a map to one or more tiles in the tile quadtree. This fast mechanism in some embodiments uses distributed computing to quickly associate the large number of geometries in the map with the large number of map tiles. The task of determining whether each geometry should be associated with a tile is treated as a task independent of other similar tasks, each of which can be assigned to different computing resources in a distributed computing environment.

For instance, one computing resource can determine whether one geometry intersects one tile. If it does, then for each tile's children, a separate intersection operation is performed in order to determine whether the geometry intersects the child tile. A separate computing resource can perform each distinct intersection operation independently of the other computing resources. This process can be viewed as "throwing" a geometry down a tile quad tree, identifying each tile node that the geometry intersects, and then sending an intersected portion of the geometry to each child node of each intersected node to determine whether the child node intersects the geometry. The geometries that are identified for each tile node are then used in the tile cut process to generate the tile.

Another novelty relates to the fast mechanism that it uses to re-encode road vector data stored in one or more different types of tiles (such as road tiles or navigation tiles) to remove unnecessary data (e.g., data that is redundant at the scale of the tile). Again, the tile cut operation uses distributed computing to distribute this task of re-encoding the vector data. Each distributed task involves initially recording the road data (which may be overlapping) of each tile on the same canvas in order to merge overlapping road geometries. The task then involves re-vector encoding this data to generate vector data that is not duplicative.

Section I below describes the mapping application of some embodiments of the invention. Section II then describes the parallel processing that some embodiments use to identify the association between tiles and map geometries. Section III then describes electronic devices that employ the mapping application of some embodiments. Section IV lastly describes location services uses by some embodiments of the invention.

I. Mapping Application

The mapping application of some embodiments is an integrated mapping application that includes several useful modalities, including location browsing, map searching, route identifying and route navigating operations. This integrated application (referred to below as the mapping application, the navigation application or the integrated application) in some embodiment is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 2:
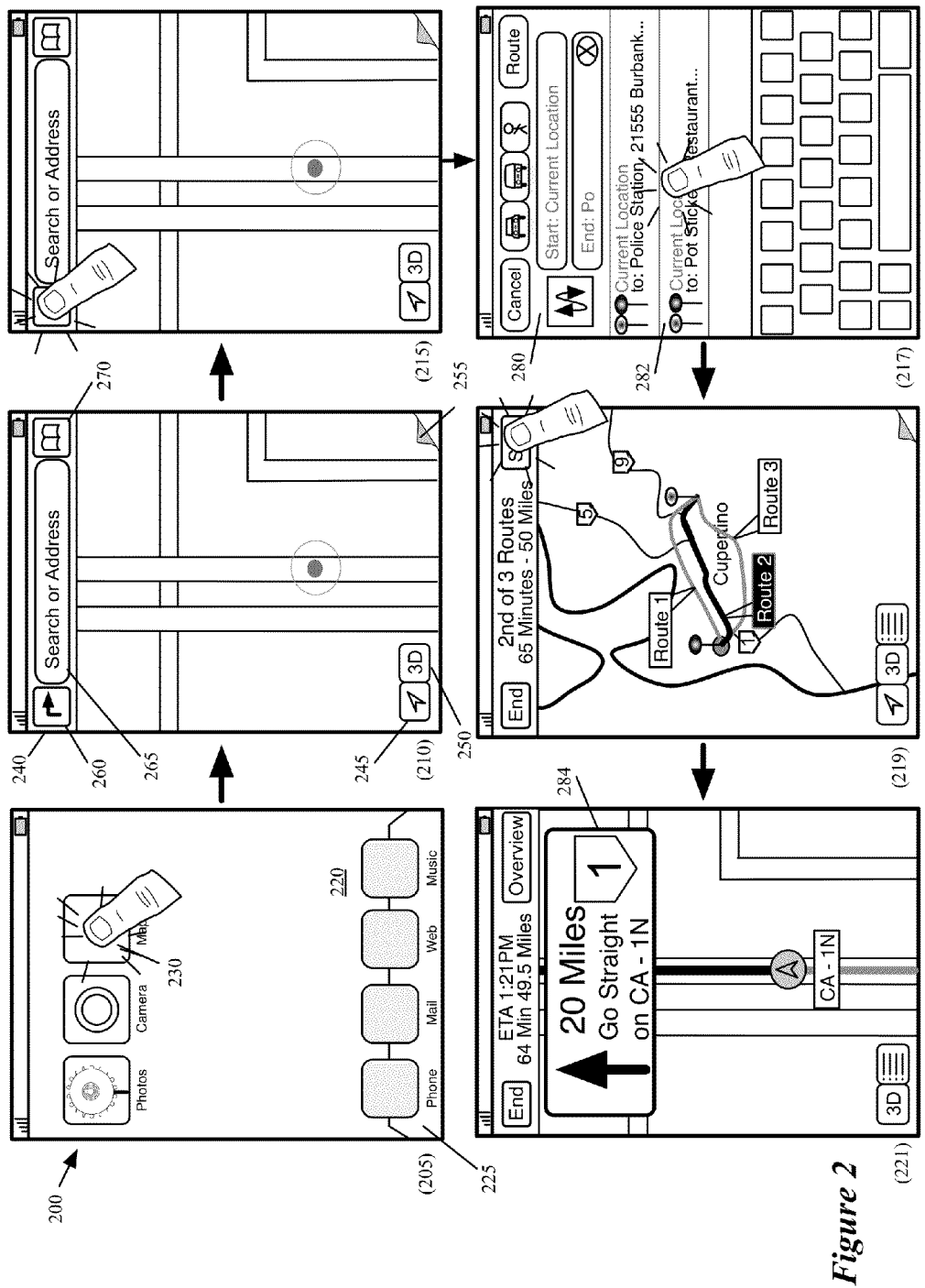
FIG. 2 illustrates an example of a device that executes an integrated mapping application of some embodiments of the invention.

FIG. 2 illustrates an example of a device 200 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 2 shows six stages 205, 210, 215, 217, 219, 221 of interaction with the mapping application. The first stage 205 shows the device's UI 220, which includes several icons of several applications in a dock area 225 and on a page of the UI. One of the icons on this page is the icon for the mapping application 230. The first stage shows a user's selection of the mapping application through touch contact with the device's screen at the location of this application on the screen.

The second stage 210 shows the device after the mapping application has opened. As shown in this stage, the mapping application's UI has a starting page that in some embodiments displays (1) a map of the current location of the device and (2) several UI controls arranged in a top bar 240, and as floating controls. As shown in FIG. 2, the floating controls include an indicator 245, a 3D control 250, and a page curl control 255, while the top bar 240 includes a direction control 260, a search field 265, and a bookmark control 270.

In some embodiments, a user can initiate a search by tapping in the search field 265. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any input on the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g. 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 270 (e.g., button) allows location and routes to be bookmarked by the application. The position indicator 245 allows the current position of the device to be specifically noted on the map. Once this indicator is selected, the application maintains the current position of the device in the center of the map. In some embodiments, it can also identify the direction to which the device currently points.

The 3D control 250 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 255 is a control that allows the application to minimize the number of on-screen controls, by placing certain less frequently used actions in a secondary UI screen that is accessible through the page curl control that is displayed on the map. In some embodiments, the page curl is permanently displayed on at least some of the map views that the application provides. For instance, in some embodiments, the application displays the page curl permanently on the starting page (illustrated in the second stage 210) that it provides for allowing a user to browse or search a location or to identify a route.

The direction control 260 opens a direction entry page 280 through which a user can request a route to be identified between a starting location and an ending location. The third stage 215 of FIG. 2 illustrates that the selection of the direction control 260 opens the direction entry page 280, which is shown in the fourth stage 217. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 265. Accordingly, the information banner control and the search field 265 are two UI tools that the application employs to make the transition between the different modalities seamless.

The fourth stage 217 shows that the direction entry page 280 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in U.S. patent application Ser. No. 13/632,102, entitled "Problem Reporting in Maps," now published as U.S. Patent Publication 2013/0326407 this U.S. patent application Ser. No. 13/632,102, now published as U.S. Patent Publication 2013/0326407, is incorporated herein by reference.

The fourth stage illustrates the user selecting one of the recent directions that was auto-populated in the table 282. The fifth stage 219 then shows three routes on a 2D map view between the specified start and end locations specified through the page 280. It also shows the selection of the second route and some information about this route in a bar at the top of the layout. This bar is shown to include start and end buttons. The start button is shown to be selected in the fifth stage.

As shown in the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 284 that identifies the distance to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 284 to the top edge of the presentation a short time period after starting the navigation presentation. As further described below, the application requires the user tap on the navigated map to bring back the top bar, its controls and the floating controls, and requires another tap to remove these controls again from the map, in some embodiments. Other embodiments provide other mechanisms for viewing and removing these controls.

Figure 3:
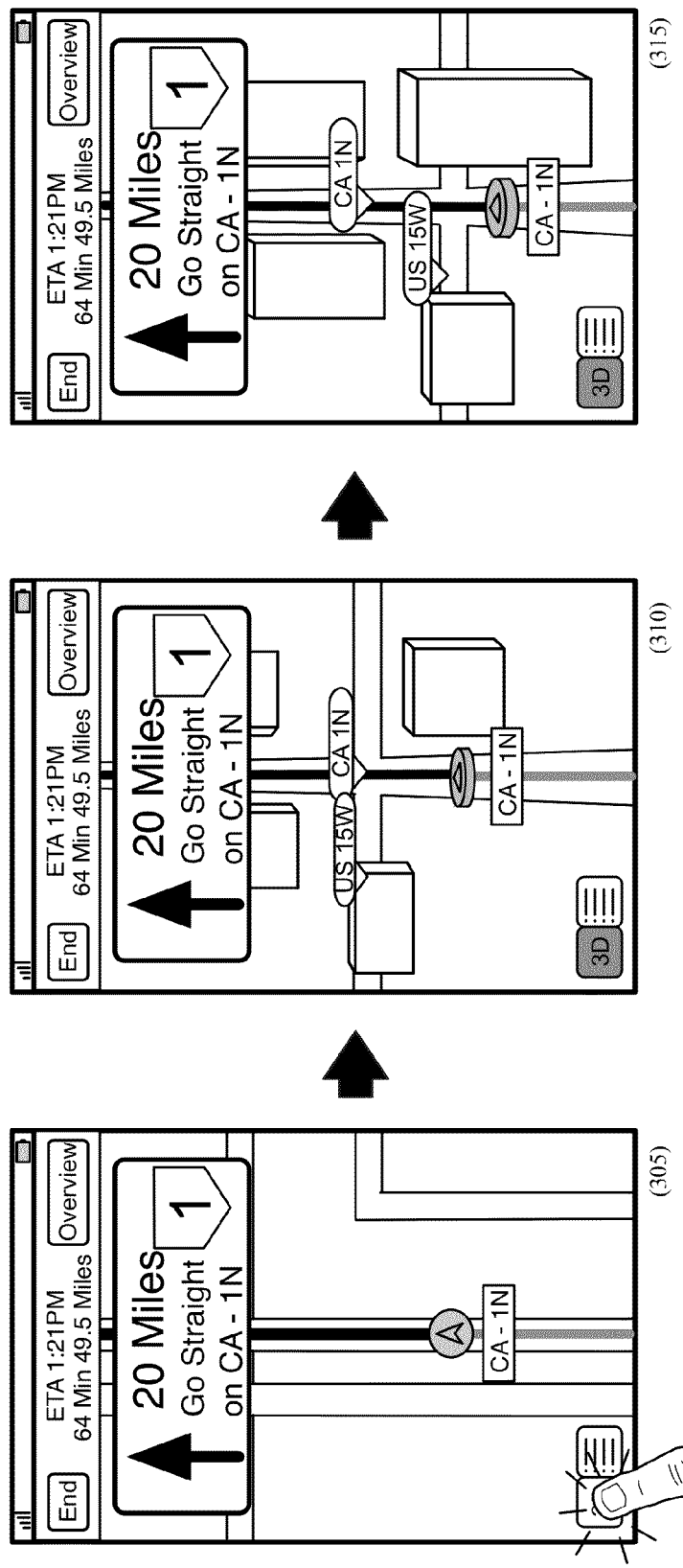
FIG. 3 illustrates how the navigation application of some embodiments provides a 3D control as a quick mechanism of entering a 3D navigating mode.

The navigation application of some embodiments can display navigation in either a 2D mode or a 3D mode. As mentioned above, one of the floating controls is the 3D control 250 that allows a user to view a navigation presentation in three dimensions (3D). FIG. 3 illustrates how the navigation application of some embodiments provides the 3D control 250 as a quick mechanism for entering a 3D navigating mode. This figure illustrates this operation in three stages 305-315. The first stage 305 illustrates the user selecting the 3D control 250 while viewing a two-dimensional navigation presentation.

The second stage 310 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view.

The third stage 315 then illustrates the navigation presentation at the end of its transition into its 3D appearance. As shown by the difference between the heights of the buildings in the second and third stages, the transition from 2D to 3D navigation in some embodiments includes an animation that shows three dimensional objects in the navigated map becoming larger. Generating such animation that shows objects rising/falling and becoming larger/smaller is further described in the U.S. patent application Ser. No. 13/632,027, entitled "Displaying 3D Objects in a 3D Map Presentation."

II. Parallel Processing to Create Tile-Geometry Association

Some embodiments utilize distributed computing to quickly associate a large number of geometries in a map with a large number of map tiles. In some embodiments, the map is divided into a hierarchical set of tiles, with each non-leaf tile having four tiles as its children. Although a quadtree is used as an example of diving a map into a hierarchy of tiles, some embodiments use other types of structured trees such as a binary tree for dividing a map into a hierarchy of tiles. The task of determining whether each geometry should be associated with a tile is treated as a task independent of other similar tasks, each of which can be assigned to a different computing resource in a distributed computing environment.

For instance, one computing resource can determine whether one geometry intersects one tile. If it does, then for each one of tile's children, a separate intersection operation is performed in order to determine whether the geometry intersects the child tile. A separate computing resource can perform each distinct intersection operation independently of the other computing resources. This process can be viewed as throwing a geometry down a tile quad tree, identifying each tile node that the geometry intersects, and then sending an intersected portion of the geometry to each child node of each intersected node to determine whether the child node intersects the geometry. The geometries that are identified for each tile node are then used in the tile cut process to generate the tile.

A. Mapping of Geometries to Intersecting Tiles

Figure 4:
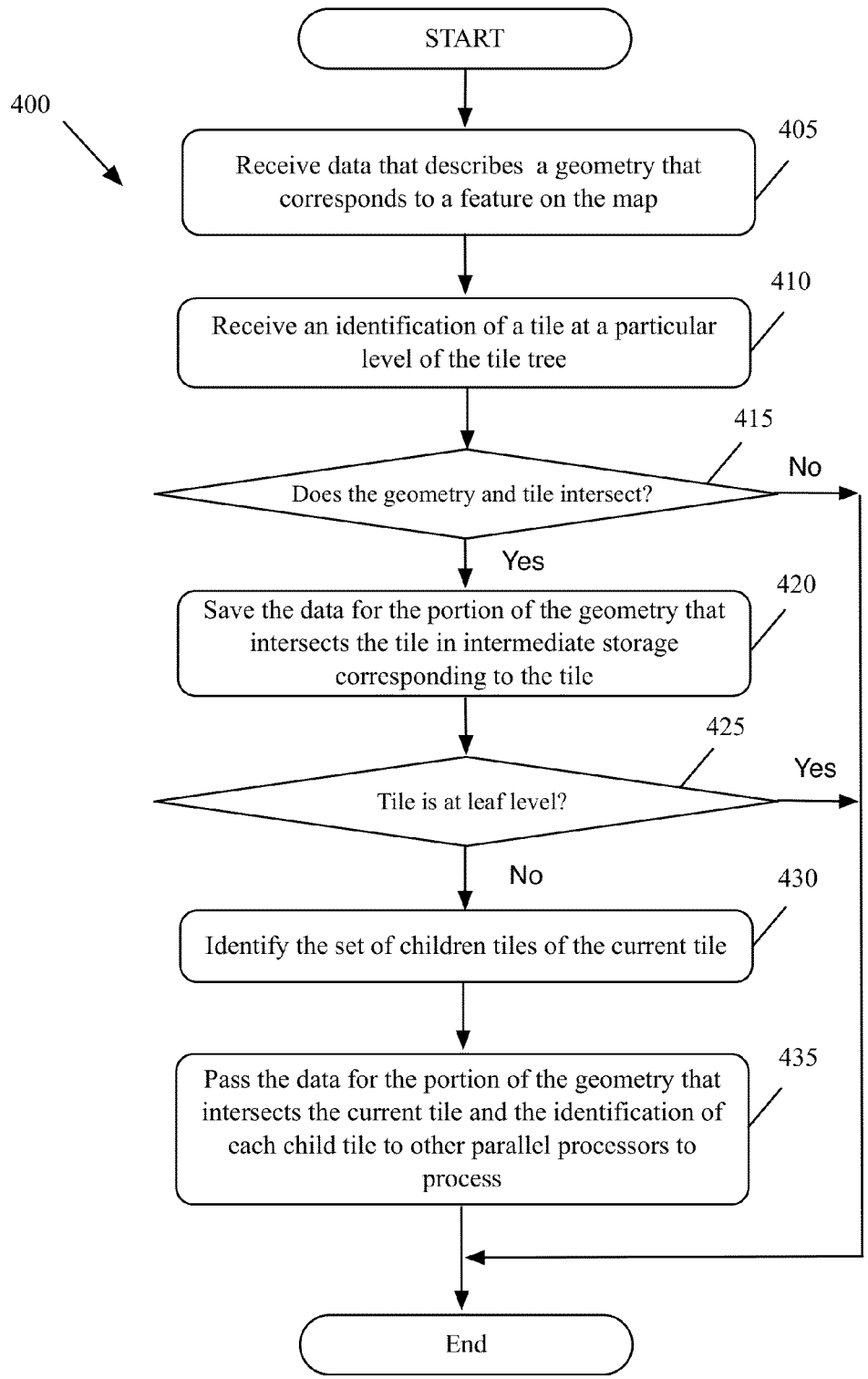
FIG. 4 conceptually illustrates a process for associating a geometry with a tile in some embodiments of the invention.

FIG. 4 conceptually illustrates a process 400 for associating a geometry with a tile in some embodiments of the invention. The process is performed by one processor in a set of parallel processing processors. Different parallel processing techniques that are utilized by some embodiments are described further below. FIG. 4 is described with respect to FIG. 5, which conceptually illustrates a geometry at different levels of a map tile tree in some embodiments of the invention.

As shown in FIG. 4, the process receives (at 405) data that describes a geometry that corresponds to a feature in the map. Example of such a geometry is a park, a lake, a road, an ocean, a river, a stadium, etc.

Figure 5:
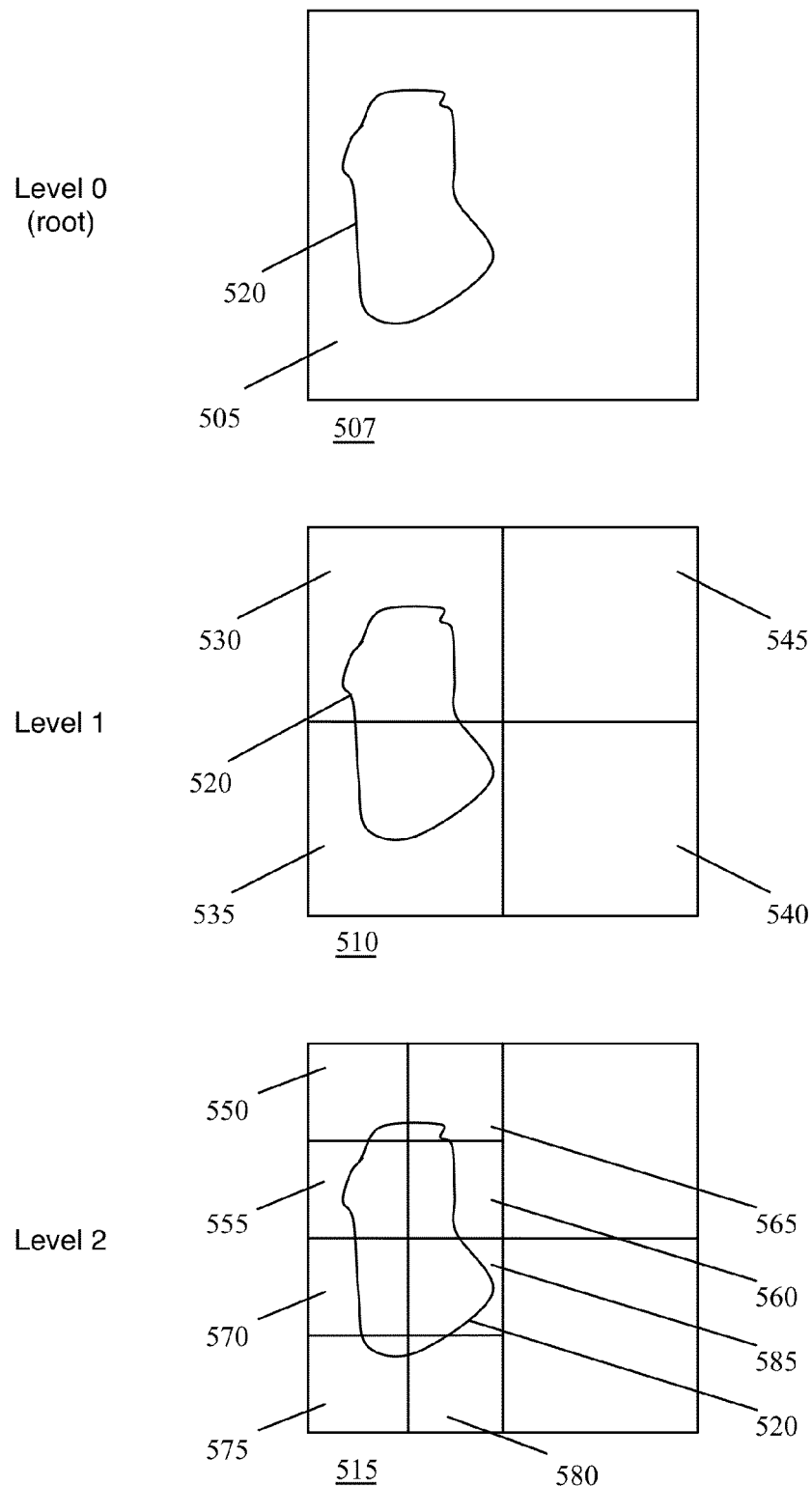
FIG. 5 conceptually illustrates a geometry at different levels of a map tile tree in some embodiments of the invention.

The process also receives (at 410) an identification of a tile at a level of the map tile tree. FIG. 5 conceptually illustrates tiles in several levels of a map tile tree. For simplicity, the figure only shows the top three levels 507-515 of a tile map in some embodiments. As shown, the root tile 505 is at zoom level 0 or the top-most level 507 of the map tile tree. Since the root tile is at the highest level of the map tile tree, the root tile intersects every geometry in the map. A geometry 520 that defines a particular feature on the map (e.g., a park in Cupertino, Calif.) is also shown. Process 400 therefore receives a description of the geometry (or a portion of the geometry as described below) and an identification of a tile in the map tile tree. As described below, the process determines whether the geometry intersects the tile and sets the input to other parallel processors that also run process 400 in order to process child tiles of the current tile when the geometry intersects the current tile.

The identification of a tile in some embodiments is a key that identifies the tile at the particular level. The tile identification also identifies the tile's parent (if not the root tile) and the tile's children (if not a leaf tile). For instance, in a tile tree where each non-leaf tile has four child tiles, some embodiments may use 0 to identify the single tile at the root level (e.g., tile 505); use 1 to 4 to identify children of the root tile in the next level where, e.g., tile 1 530 is the upper left tile of the quadrant in level 1 and tiles 2 to 4 535-545 are other tiles in the quadrant in counter clockwise order; use 5 to 20 to identify the tiles in the next level where tiles 5 to 8 550-565 are children of tile 1 and tile 5 550 is the upper left tile in the quadrant containing tiles 550-565 and tiles 6 to 8 are located counter clockwise from tile 5, tiles 9 to 12 570-585 are children of tile 2 535, etc. In these embodiments, a tile identification or key of 1 implies that the tile is at level 1 of the tile tree, located at the upper left of the quadrant, and is child of tile 0 and parent of tiles 5-8. Some embodiments store the parent-child tile relationships in a table and identify the child tiles of a tile by doing a table lookup. For instance, the table in some embodiments is indexed by the tile number. Other embodiments use other identification schemes that uniquely identify a tile at a particular position at a particular level of the tree.

The process then determines (at 415) whether the geometry and the tile intersect. For instance, in some embodiments, the geometry is defined by a set of latitude and longitude coordinates and each tile corresponds to a rectangular portion of the world map with a particular set of latitude and longitude coordinates. In these embodiments, the process compares the coordinates of different points on the borders of the geometry with the coordinates of the four corners of the tile to determine whether the geometry and the tile intersect. In other embodiments, the geometry and the tiles are defined in other terms such as x and y coordinates in a pre-determined coordinate system, etc. If the tile and the geometry do not intersect, the process ends. For instance, if the process inputs were geometry 520 and identification of tile 545, the process determines that geometry 520 does not intersect tile 545.

Otherwise, when the geometry and the tile intersect, the process saves (at 420) the data that describes the portion of the geometry that intersects the tile in an intermediate storage that corresponds to the tile. For instance, in some embodiments a portion of the intermediate storage is indexed or keyed based on the identification of each particular tile in order to save relevant information for that tile. Data structures for storing tile data are described further below.

Next, the process determines (at 425) whether the current tile is at the leaf level of the tile tree. For instance, as described above, a tile identification in some embodiments indicates the tile tree level. The process in these embodiments therefore determines whether a tile is at leaf level based on the identification of the tile.

When the tile is at the leaf level, no further processing is required and the process exits. Otherwise, the process identifies (at 430) the child tiles of the current tile. Again, the current tile identification in some embodiments identifies the child tiles. For instance, if the current tile is tile 1 530, then in the example embodiments described above, the child tiles are tiles 5 to 8 550-565.

The process then provides (at 435) the data that describes the portion of the geometry that intersects the current tile and the identification of each child to one of the available parallel processors to process. The process then exits. For instance, when the inputs to process 400 are geometry 520 and tile 505, the process passes the description of geometry 520 and identification of each of tiles 530-545 to other parallel processor to process (e.g., by adding them to a pool of tasks to be picked up and done by any available processor). In some embodiments, process 400 stores the description of the geometry, the identification of the child tiles, and any other necessary information needed in order to determine whether the child tiles and the geometry intersect in local storage. This information is then picked up in the distributed computing environment and is assigned to an available computing resource to process.

Figure 6:
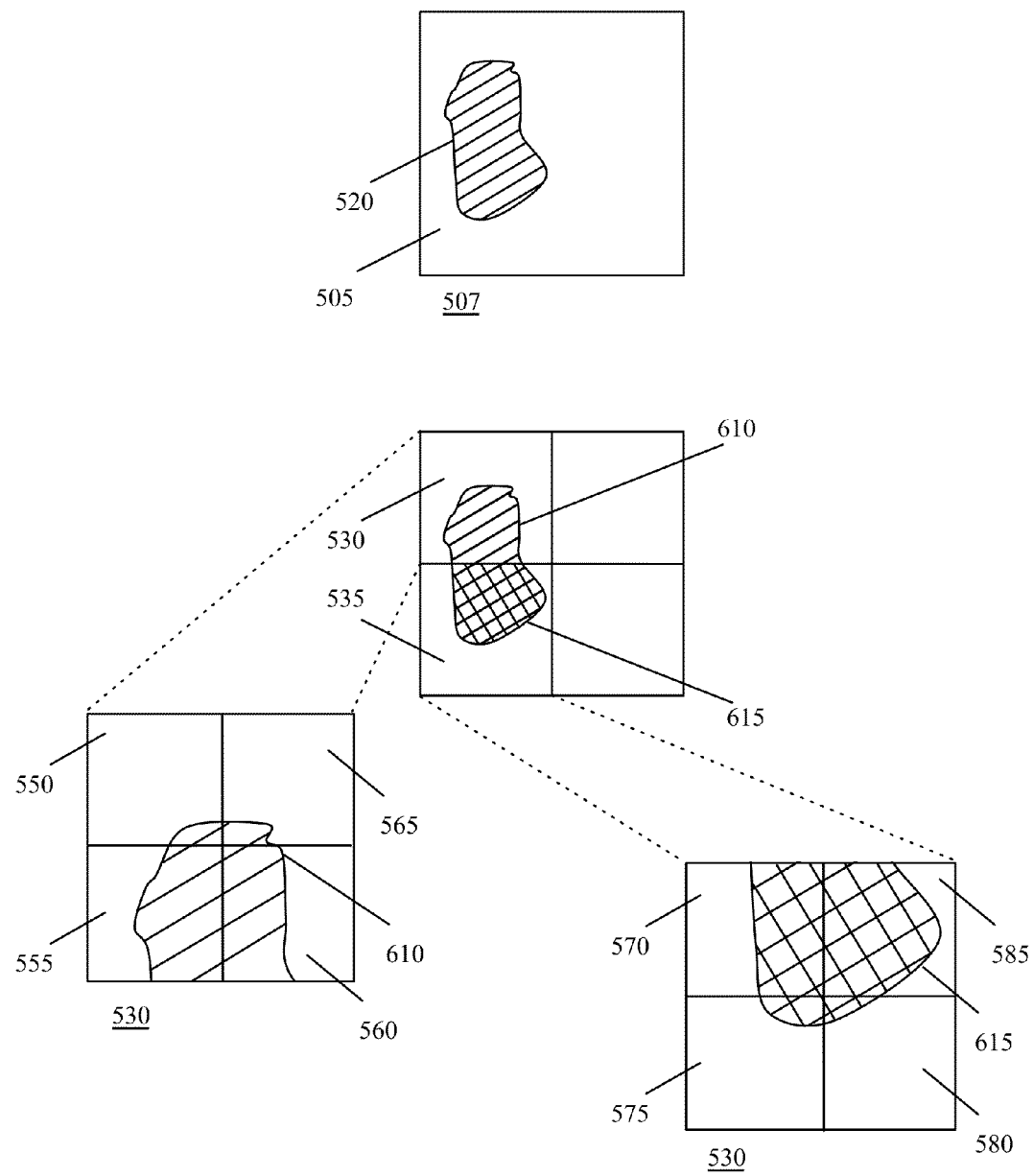
FIG. 6 conceptually illustrates another example of how the process of FIG. 4 in some embodiments pushes the geometry down the tile tree for further processing by other processors.

FIG. 6 conceptually illustrates another example of how process 400 in some embodiments pushes the geometry down the tile tree for further processing by other processors. As shown, when the inputs to process 400 are geometry 520 and tile 530, the process determines that the geometry 520 and tile 530 intersect. The process then provides the description of the portion 610 of geometry 520 that intersects tile 530 and identification of each of tiles 550-565 to other processors (e.g., by adding them to the task pool or saving the information in local storage to be picked up and assigned to an available processor) to process. Available processors then each pick up (or they are assigned by the distributed computing environment) the description of the potion 610 of the geometry 520 and the identification or the key to one of the tiles 550-565 and start processing.

On the other hand, when the inputs to process 400 are geometry 520 and tile 535, the process also determines that the geometry and tile 535 intersect. The process then provides the description of the portion 615 of geometry 520 that intersects tile 535 and identification of each of child tiles 570-585 to other processors (e.g., by adding them to the task pool or saving the information in local storage to be picked up and assigned to an available processor) to process. Available processors then each pick up the description of the potion 615 of the geometry 520 and the identification or the key to one of the tiles 570-585 and start processing.

B. Parallel Processing System

Figure 7:
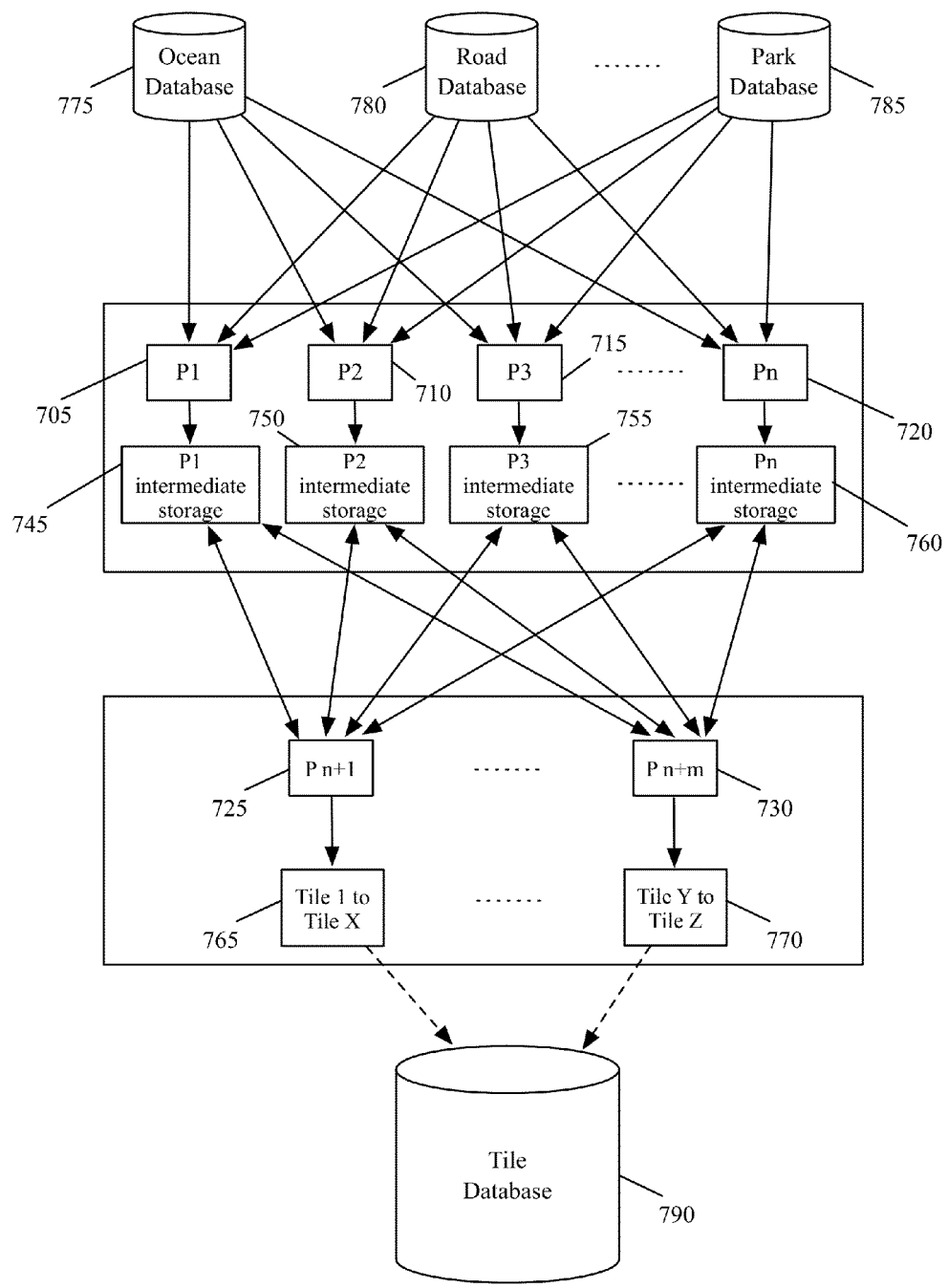
FIG. 7 conceptually illustrates a parallel processing system in some embodiments of the invention.

Some embodiments utilize a parallel processing system to identify geometries that intersect each tile and to store data to describe the intersecting geometries for each tile. FIG. 7 conceptually illustrates a parallel processing system in some embodiments of the invention. As shown, the parallel processing system includes numerous processing banks (or nodes) 705-730. In some embodiments, each processing bank corresponds to one processing unit or processor. In other embodiments, each processing bank includes several processing units. Also as shown, each processing bank 705-730 has a corresponding intermediate (or local) storage 745-770.

The parallel processing system is utilized to examine geometries stored in different databases 775-785 to determine which map tile intersects with each geometry. In the example of FIG. 7, several databases that describe different geometries such as oceans (or shorelines) 775, roads 780, and parks 785 provide input data to the parallel processing system. For instance, the park database in some embodiments may include descriptions of all parks in the world, all parks in the U.S., or all parks in a region. In some embodiments, the geometries in databases 775-785 describe each geometry by a set of coordinates (e.g., latitude and longitude, x and y coordinates in a pre-determined coordinate system, etc.).

Similarly, the map tiles are also defined by using a set of coordinates. In some embodiments, the coordinates used by some or all geometry databases 775-785 are the same as the coordinates used for map tiles. In other embodiments, the coordinates are translated (e.g., in operation 415 in FIG. 4) in order to determine whether a geometry intersects a tile.

Figure 8:
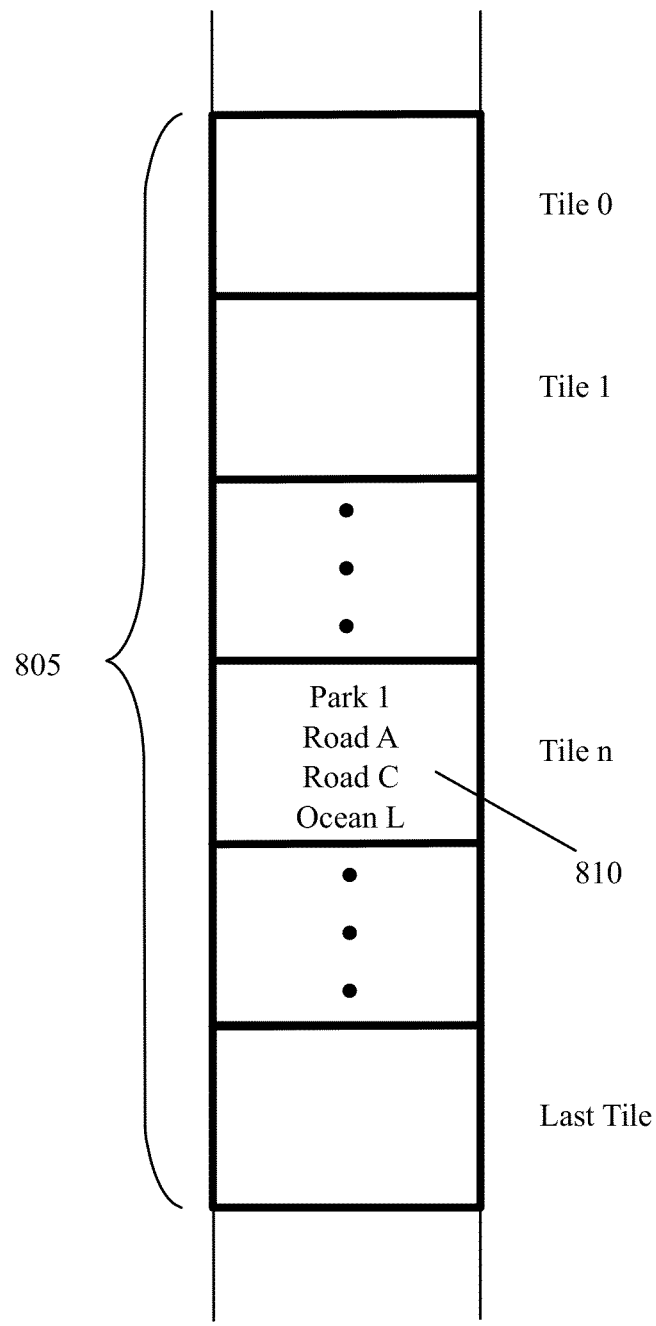
FIG. 8 conceptually illustrates a data structure stored in a non-transitory storage medium in some embodiments of the invention.

In some embodiments, each processor 705-720 determines whether a particular geometry intersects a particular tile and stores the results. FIG. 8 conceptually illustrates a data structure stored in a non-transitory storage medium in some embodiments of the invention. The data structure 805 is an example of storage utilized for storing description of geometries that intersect with each tile. As shown, the storage structure 805 includes a storage area for each tile. The storage for each tile in some embodiments is indexed based on tile identification or is otherwise made easily accessible in the data structure.

In this example, after all processing is completed, tile n 810 is determined to intersect with geometries (or features) for Park 1, Road A, Road C, and Ocean L. Some embodiments also include a description of the portion of each of the geometries that intersect each tile. Since processing to determine each geometry intersection with each tile can be performed by different processing units in different processing banks 705-720, determination that tile n and Park 1 intersect can be done by a processing unit in processing bank 705 while determination that Ocean L intersects with tile n can be done by another processing unit, e.g., in processing bank 720.

In addition, in order to propagate processing down the tile tree, each processor that detects a hit between a non-leaf tile and a geometry provides (e.g., as described by reference to operation 435 in FIG. 4) the geometry information and the child tile identifications to other processors to process. In some embodiments, each processing unit saves the results in a single data structure (e.g., in a network storage structure 790) and/or each processing unit sends the request for processing child tiles to other processing units. However, due to the large number of processing units, directly storing all of the results in a single storage structure by all processing units and exchanging geometry and child tile processing information between processing units can become time consuming and in some cases impractical.

Accordingly, some embodiments store the tile data in intermediate storage 745-760 in each processing bank and finalize merges of the tile data in parallel as described below. In addition, instead of passing geometry and child tile data directly between processing units, some embodiments place the information for processing of child tiles in common storage to be picked up by any available processing unit to process (or to be picked up by dedicated task-allocating processors and assigned to other available processors).

In some embodiments once a particular processor determines that a tile intersects with a portion of a geometry and saves the geometry portion information and the child tile identifications, then any other processor (including the particular processor) can be assigned the task of determining whether each child tile intersections the geometry portion. In other embodiments, in order to speed up the execution, the same processor that determines whether a tile intersects a portion of a geometry also determines whether any of the child tiles intersects the portion of the geometry. In these embodiments, for a particular geometry, the same processor is assigned to determine whether any tile in the tree (e.g., starting from the root tile all the way to the leaf tiles) intersects the particular geometry. In these embodiments, parallelism is provided by assigning different geometries to different processors.

C. Merging Tile Data

In some embodiments, each parallel processor or each group or bank of several processors in a much larger set of parallel processors stores the intermediate tile data in local storage. Tile data is intermediate because each tile might intersect many roads, parks, lakes, buildings, or other geometries. Since intersection of each geometry and a tile can be determined by different processors in different processing banks, the intermediate results are spread across local storages of different processing banks FIG. 9 conceptually illustrates several intermediate data structures stored in non-transitory storage mediums in some embodiments of the invention. Each data structure 905-920 is used by one processing bank 705-720 shown in FIG. 7 (e.g., each structure is stored in one of intermediate storages 745-760 respectively). As shown, all data structures 905-920 have the same format and structure as data structure 805 (shown in FIG. 8).

Figure 9:
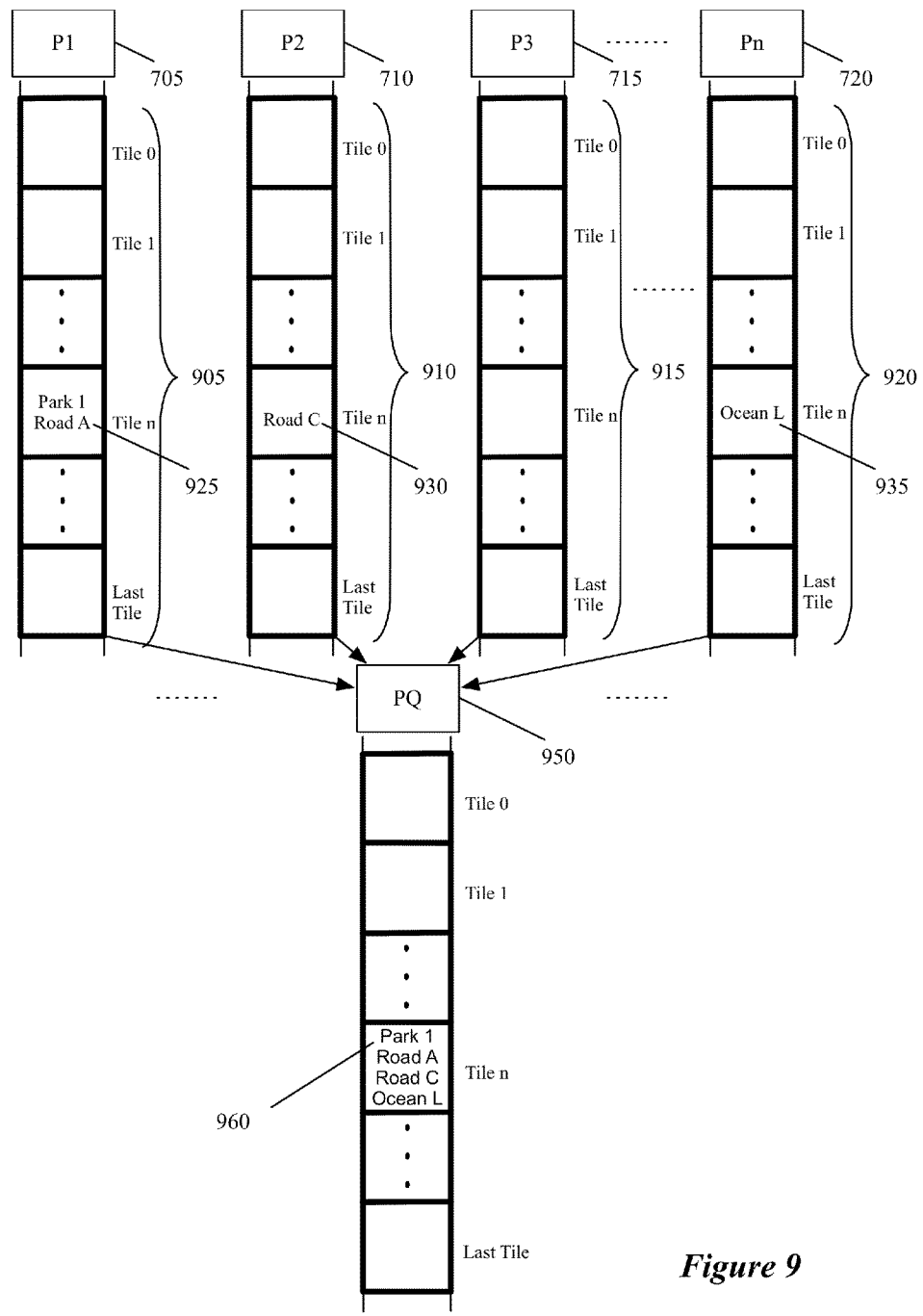
FIG. 9 conceptually illustrates several intermediate data structures stored in non-transitory storage mediums in some embodiments of the invention.

In the example of FIG. 9, a processing unit in processing bank 705 has determined that Park 1 intersects tile n. The same or a different processing unit in processing bank 705 has also determined that Road A intersects tile n. This information is stored in storage area 925 that corresponds to tile n in intermediate data structure 905. Similarly, a processing unit in processing bank 710 has determined that Road C intersects tile n. This information is stored in storage area 930 that corresponds to tile n in intermediate data structure 910. Similarly, a processing unit in processing bank 720 has determined that Ocean L intersects tile n. This information is stored in storage area 935 that corresponds to tile n in intermediate data structure 920. Data structures 905-920 are keyed to properly identify data related to each tile.

Subsequently one or more processing units in one or more processing banks (in this example in processing bank 950) collect all information processed for tile n and store them in a final data structure 960 that includes all information about which geometry intersects with tile n. In some embodiments, data structure 960 and data structure for all other tiles are collected together in a tile database 790 (as shown in FIG. 7). In other embodiments where further processing is required for tile data, structure 960 is stored in local storage of one or more processing banks that further process the data. In other words, parallel processing continues at tile level. For instance, in some embodiments, the data about roads and other features in each tile is evaluated and reconfigured to remove redundant information. The final data for the tiles are then stored in a common location 790.

Some embodiments utilize a Hadoop framework that facilitates processing of large volume of data by connecting many processing units together. A Hadoop system is a parallel processing system as well as a parallel database. In a Hadoop framework, each task (e.g., determining whether a particular tile intersects a portion of a particular geometry) is performed in isolation by a processing unit. Pieces of data (e.g., results of operations 420 or 435) are tagged with keys that informs Hadoop framework how and where to send each data item.

The Hadoop framework internally manages the data transfer. For instance, in FIG. 7, processing units 725-730 are internally utilized by the Hadoop framework to manage data distribution between processing banks 705-730. These processing units store data in distributed storage structures 765-770 and 790 as well in intermediate storage structures 745-760 of processing banks 705-720. In a Hadoop system, the processing tasks are done in isolation by processing units referred to as mappers, which store the results in intermediate data structures such as structures 905-920. The intermediate data is then further converted (e.g., by aggregating data in all structures related to tile n in data structure 960) into a final form by a set of reducers 725-730.

Once each tile data is merged into one structure, processing of each individual tile data is continued in parallel in some embodiments. For example, in some embodiments, the data about roads and other features in each tile is evaluated and reconfigured to remove redundant information while the relevant data is preserved in the new data configuration. In some embodiments, the reconfiguration is performed by rasterizing vectors that represent the roads, generating connectivity maps for the pixels, creating an undirected graph from the connectivity maps, and simplifying the resulting undirected graph to minimize the data necessary to represent the relevant portions of the original vectors.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 10:
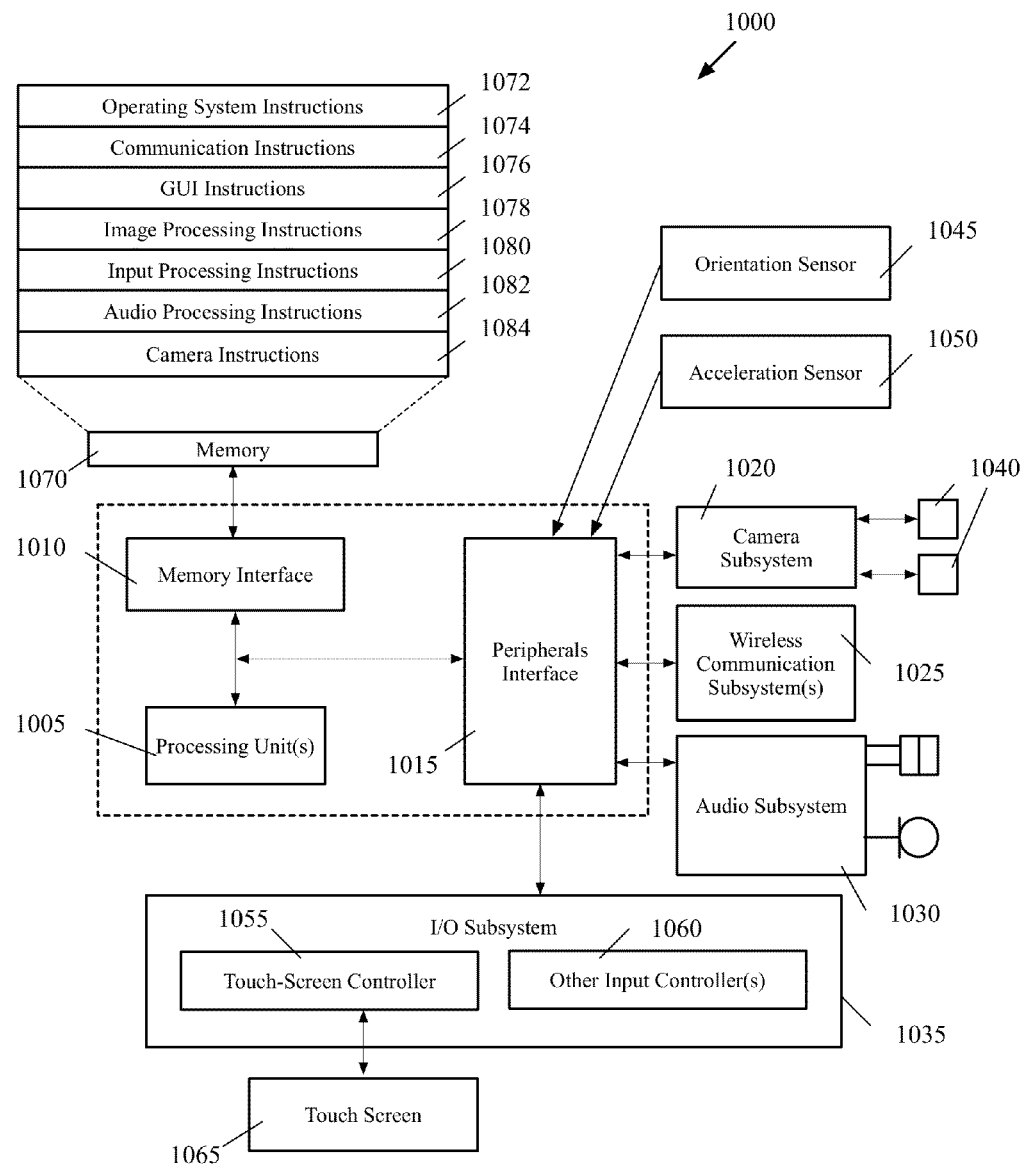
FIG. 10 is an example of an architecture of a mobile computing device in some embodiments of the invention.

The mapping and navigation applications of some embodiments operate on mobile devices, such as smart phones (e.g., iPhones®) and tablets (e.g., iPads®). FIG. 10 is an example of an architecture 1000 of such a mobile computing device. Examples of mobile computing devices include smartphones, tablets, laptops, etc. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wireless communication subsystem 1025 serves to facilitate communication functions. In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output voice navigation instructions). Additionally, the audio subsystem 1030 is coupled to a microphone to facilitate voice-enabled functions, such as voice recognition (e.g., for searching), digital recording, etc.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1072. The OS 1072 includes instructions for handling basic system services and for performing hardware dependent tasks.

The memory 1070 also includes communication instructions 1074 to facilitate communicating with one or more additional devices; graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

B. Computer System

Figure 11:
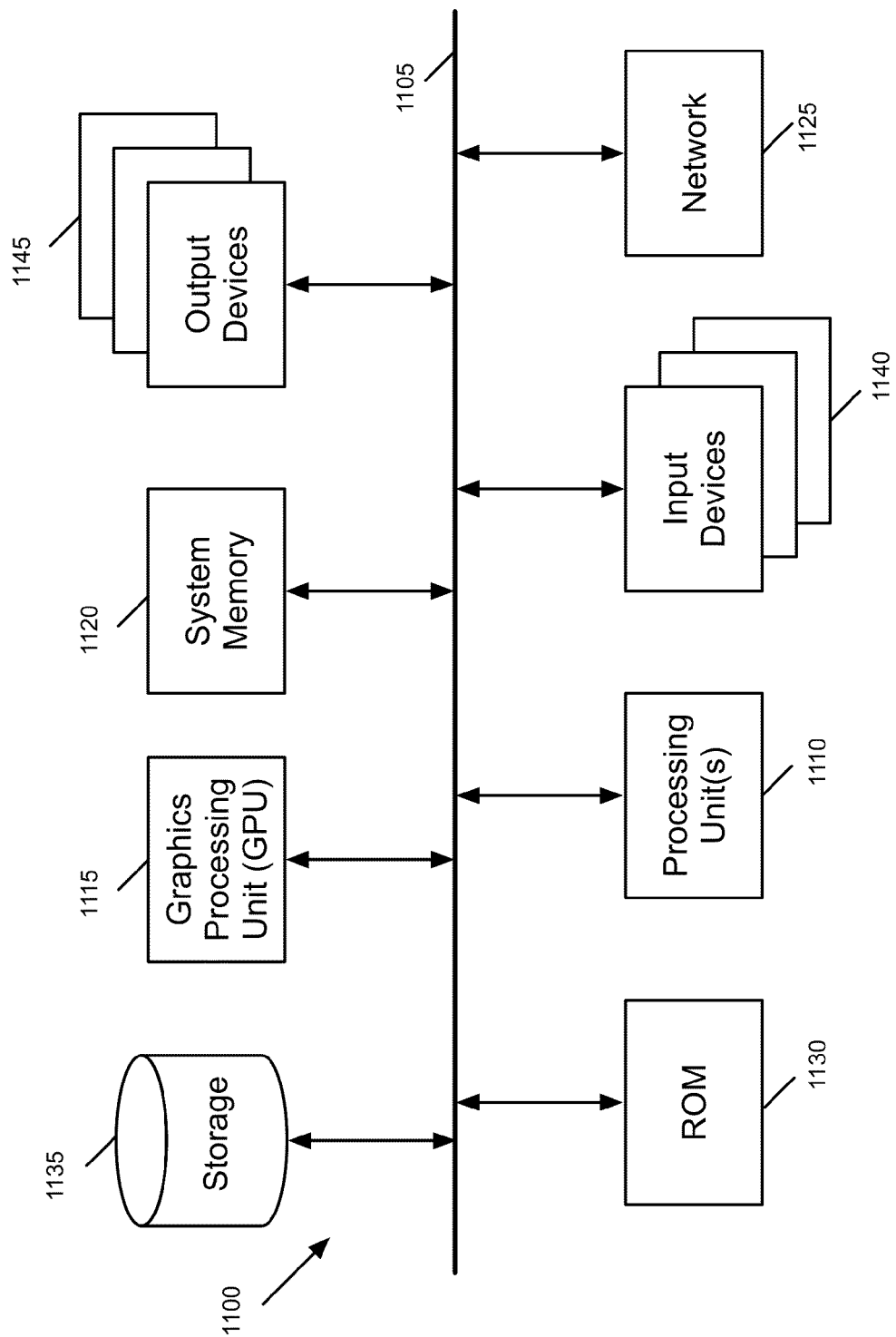
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 12:
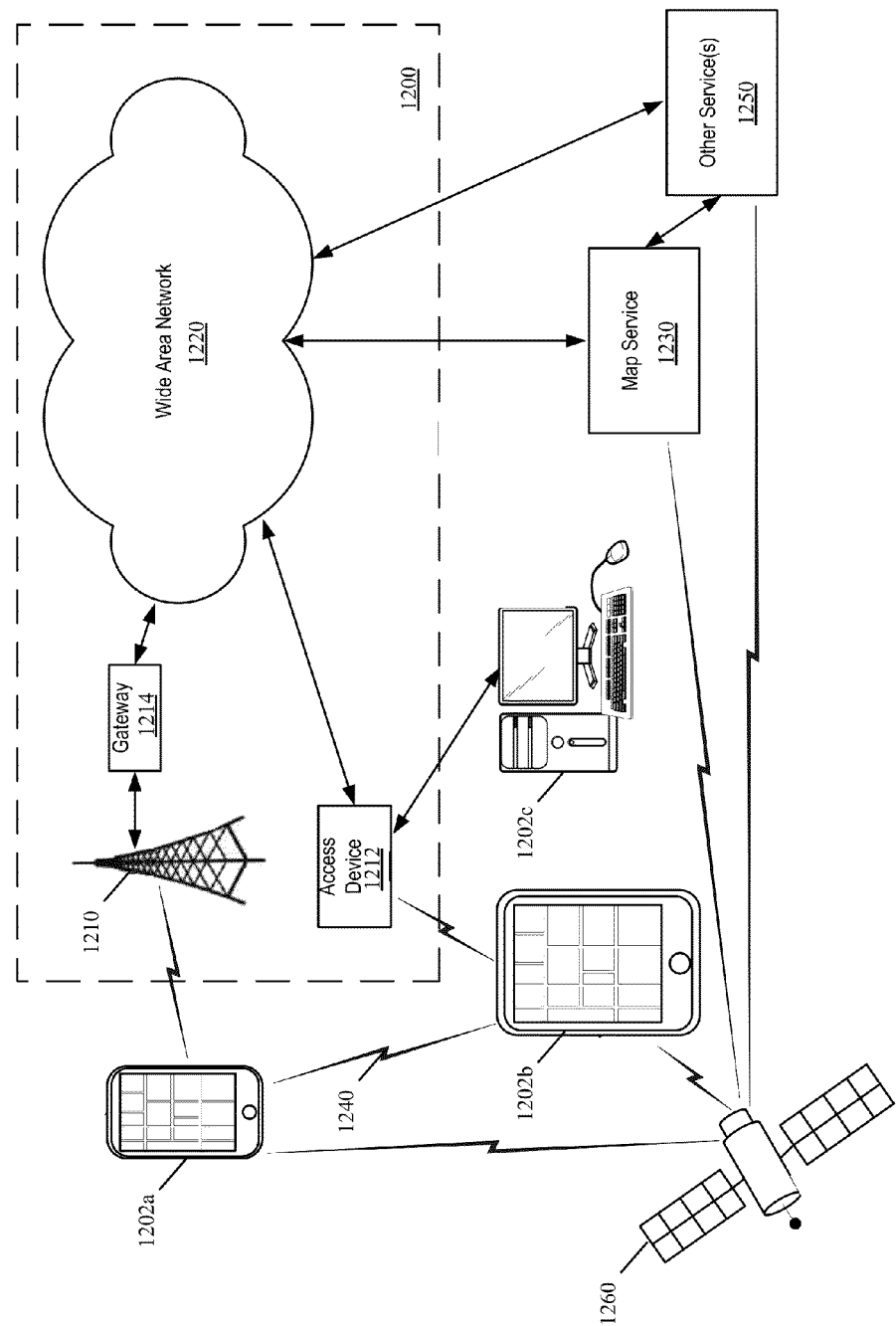
FIG. 12 illustrates a map service operating environment, according to some embodiments.

Various embodiments may operate within a map service operating environment. FIG. 12 illustrates a map service operating environment, according to some embodiments. A map service 1230 (also referred to as mapping service) may provide map services for one or more client devices 1202a-1202c in communication with the map service 1230 through various communication methods and protocols. A map service 1230 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1202a-1202c may utilize these map services by obtaining map service data. Client devices 1202a-1202c may implement various techniques to process map service data. Client devices 1202a-1202c may then provide map services to various entities, including, but not limited to, users, internal software or hardware modules, and/or other systems or devices external to the client devices 1202a-1202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format(.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1202a-1202c) are implemented on different portable-multifunction device types. Client devices 1202a-1202c utilize map service 1230 through various communication methods and protocols. In some embodiments, client devices 1202a-1202c obtain map service data from map service 1230. Client devices 1202a-1202c request or receive map service data. Client devices 1202a-1202c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 12 illustrates one possible embodiment of an operating environment 1200 for a map service 1230 and client devices 1202a-1202c. In some embodiments, devices 1202a, 1202b, and 1202c communicate over one or more wire or wireless networks 1210. For example, wireless network 1210, such as a cellular network, can communicate with a wide area network (WAN) 1220, such as the Internet, by use of gateway 1214. A gateway 1214 in some embodiments provides a packet oriented mobile data service, such as General Packet Radio Service (GPRS), or other mobile data service allowing wireless networks to transmit data to other networks, such as wide area network 1220. Likewise, access device 1212 (e.g., IEEE 802.11g wireless access device) provides communication access to WAN 1220. Devices 1202*a* and 1202*b* can be any portable electronic or computing device capable of communicating with a map service. Device 1202*c* can be any non-portable electronic or computing device capable of communicating with a map service.

In some embodiments, both voice and data communications are established over wireless network 1210 and access device 1212. For instance, device 1202*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1210, gateway 1214, and WAN 1220 (e.g., using Transmission Control Protocol/Internet Protocol (TCP/IP) or User Datagram Protocol (UDP)). Likewise, in some implementations, devices 1202*b* and 1202*c* can place and receive phone calls, send and receive e-mail messages, and retrieve electronic documents over access device 1212 and WAN 1220. In various embodiments, any of the illustrated client device may communicate with map service 1230 and/or other service(s) 1250 using a persistent connection established in accordance with one or more security protocols, such as the Secure Sockets Layer (SSL) protocol or the Transport Layer Security (TLS) protocol.

Devices 1202*a* and 1202*b* can also establish communications by other means. For example, wireless device 1202*a* can communicate with other wireless devices (e.g., other devices 1202*b*, cell phones, etc.) over the wireless network 1210. Likewise devices 1202*a* and 1202*b* can establish peer-to-peer communications 1240 (e.g., a personal area network) by use of one or more communication subsystems, such as Bluetooth® communication from Bluetooth Special Interest Group, Inc. of Kirkland, Wash. Device 1202*c* can also establish peer to peer communications with devices 1202*a* or 1202*b* (not shown). Other communication protocols and topologies can also be implemented. Devices 1202*a* and 1202*b* may also receive Global Positioning Satellite (GPS) signals from GPS satellites 1260.

Devices 1202*a*, 1202*b*, and 1202*c* can communicate with map service 1230 over the one or more wire and/or wireless networks, 1210 or 1212. For instance, map service 1230 can provide a map service data to rendering devices 1202*a*, 1202*b*, and 1202*c*. Map service 1230 may also communicate with other services 1250 to obtain data to implement map services. Map service 1230 and other services 1250 may also receive GPS signals from GPS satellites 1260.

In various embodiments, map service 1230 and/or other service(s) 1250 are configured to process search requests from any of client devices. Search requests may include but are not limited to queries for business, address, residential locations, points of interest, or some combination thereof. Map service 1230 and/or other service(s) 1250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1230 and/or other service(s) 1250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1230 and/or other service(s) 1250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1230 and/or other service(s) 1250 provide one or more feedback mechanisms to receive feedback from client devices 1202*a*-1202*c*. For instance, client devices may provide feedback on search results to map service 1230 and/or other service(s) 1250 (e.g., feedback specifying ratings, reviews, temporary or permanent business closures, errors etc.); this feedback may be used to update information about points of interest in order to provide more accurate or more up-to-date search results in the future. In some embodiments, map service 1230 and/or other service(s) 1250 may provide testing information to the client device (e.g., an A/B test) to determine which search results are best. For instance, at random intervals, the client device may receive and present two search results to a user and allow the user to indicate the best result. The client device may report the test results to map service 1230 and/or other service(s) 1250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of identifying associations between a plurality of map tiles and a geometry, the map tiles defined as a tile tree comprising the plurality of tiles at a plurality of parent-child hierarchical levels, the plurality of tiles comprising (i) a root tile having a plurality of child tiles and no parent tile, (ii) a plurality of leaf tiles, each leaf tile having only one parent tile and no child tiles, and (iii) a plurality of intermediate tiles having only one parent tile and a plurality of child tiles, the method comprising:
   at a first processing unit of a plurality of parallel processing units:
      receiving a description of the geometry and an identification of a tile in the plurality of tiles;
      determining whether the tile intersects the geometry; and
      when the tile intersects the geometry and has child tiles, storing a description of a plurality of tasks for determining whether a portion of the geometry intersects any of the child tiles of the tile, the description of each task comprising a description of the portion of the geometry that intersects the tile and an identification of a child tile of the tile; and
   at a second processing unit of a plurality of parallel processing units:
      receiving a description of a task comprising the description of a portion of the geometry and the identification of a particular child tile of the tile;
      determining whether the particular child tile intersects the portion of the geometry; and
      when the particular child tile intersects the portion of the geometry and has child tiles, storing a description of a plurality of tasks for determining whether a portion of the geometry portion that intersects the particular child tile intersects any of the child tiles of the particular child tile, the description of each task comprising a description of the portion of the geometry portion and an identification of a child tile of the particular child tile,
   each defined task assignable to a processing unit in the plurality of parallel processing units to determine whether the portion and the tile described for the task intersect.

2. The method of claim 1, wherein each hierarchical level in the tile tree corresponds to a zoom level for displaying a map on a display screen of an electronic device.

3. The method of claim 1, wherein the tile tree is a quadtree comprising a plurality of nodes, each node corresponding to a map tile, each non-leaf node having four child nodes, each node other than the root node having only one parent node.

4. The method of claim 1, wherein the identification of a tile uniquely identifies (i) a position of the tile in the tile tree and (ii) the child tiles of the tile when the tile is not a leaf tile.

5. A method of identifying associations between a plurality of map tiles and a geometry to store in the map tiles, the method comprising:
   receiving a description of the map tiles defined as a tile tree comprising the plurality of tiles at a plurality of parent-child hierarchical levels, the plurality of tiles comprising (i) a root tile having a plurality of child tiles and no parent tile, (ii) a plurality of leaf tiles, each leaf tile having only one parent tile and no child tiles, and (iii) a plurality of intermediate tiles having only one parent tile and a plurality of child tiles;
   at a first processing unit in a plurality of parallel processing units:
      receiving a description of the geometry and an identification of a particular tile in the plurality of tiles;
      determining whether the particular tile intersects the geometry; and
      when the particular tile intersects the geometry and is not a leaf tile, storing a description of a first portion of the geometry that intersects the particular tile and an identification of each child tile in the plurality of child tiles of the particular tile; and
   at a second processing unit in the set of parallel processing units:
      receiving the description of the first portion of the geometry that intersects the particular tile and the identification of a child tile of the particular tile;
      determining whether the child tile intersects the first portion of the geometry; and
      when the child tile intersects the first portion of the geometry, storing a description of a second portion of the geometry that intersects the child tile and an identification of each child tile in plurality of child tiles of said child tile.

6. The method of claim 5, wherein each hierarchical level in the tile tree corresponds to a zoom level for displaying a map on a display screen of an electronic device.

7. The method of claim 5, wherein the tile tree is a quadtree comprising a plurality of nodes, each node corresponding to a map tile, each non-leaf node having four child nodes.

8. A non-transitory computer readable medium storing a program for identifying associations between a plurality of map tiles and a geometry, the program executable by each processing unit in a plurality of parallel processing units, the map tiles defined as a tile tree comprising a plurality of tiles at a plurality of parent-child hierarchical levels, the plurality of tiles comprising (i) a root tile having a plurality of child tiles and no parent tile, (ii) a plurality of leaf tiles, each leaf tile having only one parent tile and no child tiles, and (iii) a plurality of intermediate tiles having only one parent tile and a plurality of child tiles, the program comprising sets of instructions for:
   at a first processing unit of a plurality of parallel units:
      receiving a description of the geometry and an identification of a tile in the plurality of tiles;
      determining whether the tile intersects the geometry; and
      when the tile intersects the geometry and has child tiles, storing a description of a plurality of tasks for determining whether a portion of the geometry intersects any of the child tiles of the tile, the description of each task comprising a description of the portion of the geometry that intersects the tile and an identification of a child tile of the tile; and
   at a second processing unit of a plurality of parallel processing units:
      receiving a description of a task comprising the description of a portion of the geometry and the identification of a particular child tile of the tile;
      determining whether the particular child tile intersects the portion of the geometry; and when the particular child tile intersects the portion of the geometry and the child tiles, storing a description of a plurality of tasks for determining whether a portion of the geometry portion that intersects the particular child tile intersects any child tiles of the particular child tile, the description of each task comprising a description of the portion of the geometry portion and an identification of each child tile of the particular child tile, each defined task assignable to a processing unit in the plurality of parallel processing units to determine whether the portion and the tile described for the task intersect.

9. A non-transitory computer readable medium storing a program for identifying associations between a plurality of map tiles and a geometry, the program executable by each processing unit in a plurality of parallel processing units, the map tiles defined as a tile tree comprising the plurality of tiles at a plurality of parent-child hierarchical levels, the plurality of tiles comprising (i) a root tile having a plurality of child tiles and no parent tile, (ii) a plurality of leaf tiles, each leaf tile having only one parent tile and no child tiles, and (iii) a plurality of intermediate tiles having only one parent tile and a plurality of child tiles, the program comprising sets of instructions for:

receiving, at a processing unit of the plurality of parallel processing units a description of the geometry and an identification of the root tile in the plurality of tiles;

determining whether the root tile intersects the geometry;

when the root tile intersects the geometry and has child tiles, storing a description of a plurality of tasks for determining whether a portion of the geometry intersects any of the child tiles of the root tile, the description of each task comprising a description of the portion of the geometry that intersects the tile and an identification of a child tile of the tile; and assigning, for each particular tile in the tile tree that (i) has a parent tile and (ii) the parent tile of which intersects a particular portion of the geometry, a processing unit in the plurality of processing units to determine whether the particular tile intersects the particular portion of the geometry by:

receiving a description of the particular portion of the geometry and an identification of the particular tile;

determining whether the particular tile intersects the particular portion of the geometry;

determining whether the particular tile has child tiles; and storing, when the particular tile intersects the particular portion of the geometry and has child tiles, a description of a plurality of tasks for determining whether a portion of the geometry that intersects the particular tile intersects any of the child tiles of the particular tile, the description of each task comprising a description of a portion of the geometry that intersects the particular tile and an identification of a child tile of the particular tile, each task assignable to a processing unit in the plurality of parallel processing units to determine whether any portion of the geometry intersects any of the child tiles of the particular tile.

10. The non-transitory computer readable medium of claim 9, the program further comprising a set of instructions for storing, when a processing unit determines that a tile intersects the geometry, a description of the portion of the geometry that intersects the tile in a local storage of the processing unit.

11. The non-transitory computer readable medium of claim 10, the program further comprising a set of instructions for:

retrieving, from local storage of different processing units, the descriptions of the portions of the geometry that intersect each particular tile; and merging the retrieved descriptions in storage structure corresponding to each particular tile.

12. The non-transitory computer readable medium of claim 8, wherein each hierarchical level in the tile tree corresponds to a zoom level for displaying a map on a display screen of an electronic device.

13. The non-transitory computer readable medium of claim 8, wherein the tile tree is a quadtree comprising a plurality of nodes, each node corresponding to a map tile, each non-leaf node having four child nodes, each node other than the root node having only one parent node.

14. The computer readable medium of claim 8, wherein the identification of a particular tile uniquely identifies (i) a position of the particular tile in the tile tree and (ii) the child tiles of the particular tile when the tile is not a leaf tile.

15. A non-transitory computer readable medium storing a program for identifying associations between a plurality of map tiles and a geometry to store in the map tiles, the program comprising sets of instructions for:

receiving a description of the map tiles defined as a tile tree comprising the plurality of tiles at a plurality of parent-child hierarchical levels, the plurality of tiles comprising (i) a root tile having a plurality of child tiles and no parent tile, (ii) a plurality of leaf tiles, each leaf tile having only one parent tile and no child tiles, and (iii) a plurality of intermediate tiles having only one parent tile and a plurality of child tiles;

at a first processing unit in a set of parallel processing units:
receiving a description of the geometry and an identification of a particular tile in the plurality of tiles, the tile having a plurality of child tiles;
determining whether the particular tile intersects the geometry; and
storing, when the particular tile intersects the geometry and is not a leaf tile, a description of a first portion of the geometry that intersect the particular tile and an identification of each child tile in the plurality of child tiles of the particular tile; and at a second processing unit in the set of parallel processing units:
receiving the description of the first portion of the geometry that intersects the particular tile and the identification of a child tile of the particular tile;
determining whether the child tile intersects the first portion of the geometry; and
when the child tile intersects the first portion of the geometry, storing a description of a second portion of the geometry that intersects the child tile and an identification of each child tile in the plurality of child tiles of said child tile.

16. The non-transitory computer readable medium of claim 15, wherein each hierarchical level in the tile tree corresponds to a zoom level for displaying a map on a display screen of an electronic device.

17. The non-transitory computer readable medium of claim 15, wherein the tile tree is a quadtree comprising a plurality of nodes, each node corresponding to a map tile, each non-leaf node having four child nodes.

* * * * *